US006630644B2

(12) United States Patent
Troitski et al.

(10) Patent No.: US 6,630,644 B2
(45) Date of Patent: Oct. 7, 2003

(54) METHOD CREATING DAMAGE ARRANGEMENT FOR PRODUCTION OF 3D LASER-INDUCED DAMAGE PORTRAITS INSIDE TRANSPARENT MATERIALS

(75) Inventors: Igor Troitski, Henderson, NV (US); George M. Jewett, Las Vegas, NV (US)

(73) Assignee: Troitski, Henderson, NV (US)

( * ) Notice: Subject to any disclaimer, the term of this patent is extended or adjusted under 35 U.S.C. 154(b) by 59 days.

(21) Appl. No.: 10/078,099

(22) Filed: Feb. 19, 2002

(65) Prior Publication Data

US 2003/0155334 A1 Aug. 21, 2003

(51) Int. Cl.[7] .............................................. B23K 26/00
(52) U.S. Cl. .................................. 219/121.69; 347/224
(58) Field of Search ....................... 219/121.68, 121.69; 347/224; 700/166

(56) References Cited

U.S. PATENT DOCUMENTS

| | | | | |
|---|---|---|---|---|
| 3,715,734 A | | 2/1973 | Fajans | |
| 4,092,518 A | | 5/1978 | Merard | |
| 4,843,207 A | | 6/1989 | Urbanek | |
| 5,206,496 A | | 4/1993 | Clement | |
| 5,575,936 A | | 11/1996 | Goldfarb | |
| 5,637,244 A | | 6/1997 | Erokhin | |
| 5,886,318 A | | 3/1999 | Vasiliev et al. | |
| 6,087,617 A | | 7/2000 | Troitski et al. | |
| 6,333,486 B1 | * | 12/2001 | Troitski | |
| 6,399,914 B1 | * | 6/2002 | Troitski | |
| 6,417,485 B1 | * | 7/2002 | Troitski | |
| 6,426,480 B1 | * | 7/2002 | Troitski | |
| 6,509,548 B1 | * | 1/2003 | Troitski | 219/121.69 |
| 6,537,479 B1 | * | 3/2003 | Colea | 219/121.69 |
| 2002/0046994 A1 | * | 4/2002 | Miesak | 219/121.69 |

FOREIGN PATENT DOCUMENTS

| | | |
|---|---|---|
| EP | 0743128 A1 | 11/1996 |
| RU | 321422 | 11/1970 |
| RU | 20082288 C1 | 2/1994 |
| RU | WO 96/30219 | 3/1995 |
| SU | 1838163 | 3/1992 |

OTHER PUBLICATIONS

Troitski, "System for creation of laser–induced damage images and problems of their optimization", Proc. of SPIE, vol. 3902 (2000), 489–499.*

Troitski,"Experience of creation of laser–induced damage images," Proc. of SPIE, vol. 3902 (2000), 479–488.*

Troitski,"Image recording by laser–induced damages," Optical Memory and Neural Networks, vol. 9, No. 4, 2000.*

Troitski, "Method and laser system for creating high–resolution laser–induced damage images" Proc. of SPIE, vol. 4679 (2001), 392–399.*

* cited by examiner

*Primary Examiner*—Geoffrey S. Evans

(57) ABSTRACT

A method for creating arrangement of damages for production of 3D laser-induced damage portraits with the space resolution, which is equal to the appropriate computer 3D model, is disclosed. 3D laser-induced damage portraits produced by the method, have sufficiently tight faces and profiles so that the clearance surface dose not interfere the face surface, and the right (left) profile does not interfere with the left (right) profile. These effects are created by production of the sophisticated arrangement of damages, placed both on 3D portrait surface and inside area of the 3D portrait. Due to the method it is possible to make laser-induced damages, corresponding to all pixels of the 3D computer model and reproduced the right brightness of the material point without the internal split.

5 Claims, 8 Drawing Sheets

METHOD CREATING DAMAGE ARRANGEMENT FOR PRODUCTION OF 3D LASER-INDUCED DAMAGE PORTRAITS INSIDE TRANSPARENT MATERIALS

FIELD OF THE INVENTION

The present invention relates to methods for producing high quality laser-induced damage images (in particularly 3D portraits) in transparent objects using high power laser radiation on basis of the breakdown phenomenon.

BACKGROUND OF THE INVENTION

A number of techniques for creating a variety of patterns on the surface and inside of transparent substrates using pulsed laser radiation are well known.

One publication disclosing such techniques is the Russian invention #321422 to Agadjanov et. al., published on Nov. 16, 1970 (#140454529-33). The invention concerns a method of manufacturing decorative products inside a transparent material by changing the material structure by laser radiation. As disclosed, by moving a material relative to a focused laser beam, it is possible to create a drawing inside the material.

U.S. Pat. No. 3,715,734 to Fajans discloses a three-dimensional memory storage unit, which is prepared by carbonizing selected spots in a block of polymethylmethacrylate by means of a steeply converging laser beam. The energy of the beam is applied in pulses of such duration and at such intensity that carbonization takes place only at the focal point of the beam.

U.S. Pat. No. 4,092,518 to Merard discloses a method for decorating transparent plastic articles. This technique is carried out by directing a pulsed laser beam into the body of an article by successively focusing the laser beam in different regions within the body of the article. The pulse energy and duration is selected based upon the desired extent of the resulting decorative pattern. The effect of the laser is a number of "macro-destructions" (fissures in the material of the article) appearing as fanned-out cracks. The pattern of the cracks produced in the article is controlled by changing the depth of the laser beam focus along the length of the article. Preferably, the article is in the form of a cylinder, and the cracks are shaped predominantly as saucer-like formations of different size arranged randomly around the focal point of the optical system guiding a laser beam. The device used to carry out this technique is preferably a multi-mode solid-state, free-running pulse laser used in conjunction with a convergent lens having a focal length from 100 to 200 mm.

U.S. Pat. No. 4,843,207 to Urbanek et al. discloses a method of creating controlled decorations on the surface of a hollow symmetrical transparent article. This technique is preferably carried out on glass. The glass is preconditioned with a coating on the outer surface of the glass being approximately 1.2 mm thick and made of a material having at least 75% absorption of laser radiation. The technique is also carried out using a laser having a wave of length of 0.5 to 2 microns acting upon the external coating through the wall of the cylindrical glass article. The laser beam moves so that it is focused on the surface of the cylinder, and moves about the axis of symmetry of the cylinder to irradiate the aforementioned surface coating. As a result, the irradiated portions of the surface coating go through a phase change and a pattern is formed.

U.S. Pat. No. 5,206,496 to Clement et al. discloses a method and apparatus for providing in a transparent material, such as glass or plastic, a mark which is visible to the naked eye or which may be "seen" by optical instruments operating at an appropriate wavelength. The Clement et al. Patent describes a method and apparatus for producing a subsurface marking which is produced in a body such as bottle, by directing into the body a high energy density beam and bringing the beam to focus at a location spaced from the surface, so as to cause localized ionization of the material. In the preferred embodiment the apparatus includes a laser as the high energy density beam source. The laser may be a Nd-YAG laser that emits a pulsed beam of laser radiation with a wavelength of 1064 nm. The pulsed beam is incident upon a first mirror that directs the beam through a beam expander and a beam combiner to a second mirror. A second source of laser radiation in the form of a low power He-Ne laser emits a secondary beam of visible laser radiation with a wavelength of 638 m. The secondary beam impinges upon the beam combiner where it is reflected toward the second reflecting surface coincident with the pulsed beam of laser radiation from the Nd-YAG laser. The combined coincident beams are reflected at the reflecting surface via reflecting two other surfaces to a pair of movable mirrors for controlling movement of the beam. The beam then passes through a lens assembly into the body to be marked.

Soviet patent publication 1838163 to P. V. Agrynsky, et. al discloses a process for forming an image in a solid media by processing of the optically transparent solid material by a beam of radiation with changeable energy for creation of the image.

WIPO Patent Document No. 96/30219 to Lebedev et al. discloses a technology for creating two- or three-dimensional images inside a polymer material using penetrating electromagnetic radiation. The technology can be used for marking and for producing decorative articles and souvenirs. Specifically, laser radiation is used as the penetrating radiation, and carbonizing polymers are used as the polymer material. By these means, it is possible to produce both black and half-tone images in the articles.

U.S. Pat. No. 5,575,936 to Goldfarb discloses a process and apparatus where a focused laser beam causes local destruction within a solid article, without effecting the surface thereof. The apparatus for etching an image within a solid article includes a laser focused to a focal point within the article. The position of the article with respect to the focal point is varied. Control means, coupled to the laser, and positioning means are provided for firing the laser so that a local disruption occurs within the article to form the image within the article.

U.S. Pat. No. 5,637,244 to Erokhin discloses a technique which depends on a particular optical system including a diffraction limited Q-switched laser (preferably a solid-state single-mode $TEM_{00}$) aimed into a defocusing lens having a variable focal length to control the light impinging on a subsequent focusing lens that refocuses the laser beam onto the transparent article being etched. The laser power level, operation of the defocusing lens, and the movement of the transparent article being etched are all controlled by a computer. The computer operates to reproduce a pre-programmed three-dimensional image inside the transparent article being etched. In the computer memory, the image is presented as arrays of picture elements on various parallel planes. The optical system is controlled to reproduce the stored arrays of picture elements inside the transparent material. A method for forming a predetermined half-tone image is disclosed. Accordance to the method, microdestructions of a first size are created to form a first portion of the image and microdestruction of a second size different from the first size are created to form a second portion of the image. Microdestructions of different sizes are created by changing the laser beam focusing sharpness and the radiation power thereof before each shot.

U.S. Pat. 5,886,318 to A. Vasiliev and B. Goldfarb discloses a method for laser-assisted image formation in transparent specimens, which consists in establishing a laser beam having different angular divergence values in two mutually square planes. An angle between the plane with a maximum laser beam angular divergence and the surface of the image portion being formed is changed to suit the required contrast of an image. EPO Patent Document 0743128 to Balickas et al. disclose a method of marking products made of transparent materials which involves concentration of a laser beam in the material which does not absorb the beam, at a predetermined location, destruction of the material by laser pulses and formation of the marking symbol by displacement of the laser beam. Destruction of the material at that location takes place in two stages. In the first stage, the resistance of the material to laser radiation is altered, while, in the second stage, destruction of the material takes place at that location.

Russian patent publication RU 20082288 to S. V. Oshemkov discloses a process for laser forming of images in solid media by the way of focusing of laser radiation in a point inside a sample which differs by following: with the aim to save the surface and the volume of the sample before the definite point and creation of three dimensional images, the sample is illuminated with the power density higher than the threshold of volume breakdown and moving the sample relatively to the laser beam in three orthogonal directions.

U.S. Pat. No. 6,087,617 to Troitski et al. discloses a computer graphic system for producing an image inside optically transparent material. An image reproducible inside optically transparent material by the system is defined by potential etch points, in which the breakdowns required to create the image in the selected optically transparent material are possible. The potential etch points are generated based on the characteristics of the selected optically transparent material. If the number of the potential etch points exceeds a predetermined number, the system carries out an optimization routine that allows the number of the generated etch points to be reduced based on their size. To prevent the distortion of the reproduced image due to the refraction of the optically transparent material, the coordinates of the generated etch points are adjusted to correct their positions along a selected laser beam direction.

U.S. patent application Ser. No. 09/354,236 to Troitski discloses a laser-computer graphic system for generating portrait and 3-D reproductions inside optically transparent material. The invention discloses the method for production of a portrait with the same gray shades like a computer image by using a multi-layer picture. Points of every layer are arranged so that the distance between adjacent etch points are equal to the minimal distance between etch points that can be provided without the breakage of the material. Every layer is parallel with respect to the portrait plane, and distance between parallel planes is set equal to minimal distance at which the breakage of the material does not occur.

U.S. patent application Ser. No. 09/557,306 to Troitski discloses method and laser system for creation of laser-induced damages to produce high quality images. Accordance to the invention, a laser-induced damage is produced by simultaneously generating breakdowns in several separate focused small points inside the transparent material area corresponding to this etch point. Damage brightness is controlled by variation of a number of separate focused small points inside the transparent material area.

U.S. patent application Ser. No. 09/583,454 to Troitski discloses method and laser system controlling breakdown process development and space structure of laser radiation for production of high quality laser-induced damage images. Accordance to the invention, at the beginning an applied laser radiation level just exceeds an energy threshold for creating a plasma condition in the material, and thereafter the energy level of the applied laser radiation is just maintain the plasma condition. Accordance to another method a laser generates a $TEM_{mn}$ radiation. The values of the integers m and n are controlled and determined so as to reproduce particular gray shades for a particular point of an image.

Laser-induced damage image is a plurality of damages inside a transparent material created by a pulsed laser beam, which is periodically focused at predetermined points of the material. These damages become visible by scattering the exterior light. It is clear, that visual appeal of a damage image is defined by two facts: the first—scattering signature of the damages and the second—the way by which the damages are arranged to reproduce the image.

Analyzing the methods of all aforementioned Patents it is clear that almost of them disclose creation of laser-induced damages and teach to displace mutually a transparent material and a laser beam in order to establish a next damage. However the Patents do not disclose how the damages should be replaced inside a transparent material to reproduce the right image with high quality. Only two Patents and one Patent Application touch on the problem: U.S. Pat. No. 5,637,244 to Erokhin; U.S. Pat. No. 6,087,617 to Troitski et al. and U.S. patent application Ser. No. 09/354,236 to Troitski.

In particularly, U.S. Pat. No. 5,637,244 to Erokhin disclose a method for forming a predetermined decorative image inside a transparent material "wherein the focusing step comprises moving the transparent material relative to the laser beam perpendicularly to the laser beam to create microdestructions that form a first two-dimensional plane section of the decorative image, said first plane section appearing as a first array of image elements of the decorative image". Thereby the patent teaches how the damages should be produced in order that previous damage does not hinder next damage but the patent does not disclose how to create such damage arrangement or in other words, how the damages should be replaced in space of a material to produce high quality images.

U.S. Pat. No. 6,087,617 to Troitski et al. and U.S. patent application Ser. No. 09/354,236 to Troitski disclose methods of damage arrangements, however, the methods do not give a chance to produce 3D portraits of high quality. Indeed, the base of these methods is the production of laser-induced damage images containing damages with minimal distance between them more than $d_0$ (if the distance between adjacent damages is smaller than $d_0$, the internal split can occur). Consequently, such images have two principal particularities, which for 3D portraits became general defects: the first—since minimal distance between adjacent damages is not equal to zero, total number of damages in an image is smaller than total number of pixels in the computer image and therefore the spatial resolution of the image produced inside transparent material is smaller than the applicable computer image; the second—since the distance between adjacent damages is not equal to zero and usually it is about the damage size, you will see the clearance surface of such 3D image although you will look at its face. The last factor decreases portrait contrast, creates noise background, match front and back images. All this decreases 3D portrait quality essentially. Consequently, such 3D portraits have bad quality and, for practical purposes, only half—3D portraits (without the back sections) are produced.

The invention discloses the method for production of 3D portraits without these defects.

SUMMARY OF THE INVENTION

The present invention has its principal task to provide a method for production of high quality laser-induced damage 3D portraits, which has the same space resolution as the applicable computer model and which has sufficiently tight front face, right and left profiles so that the clearance surface does not interfere the front surface and the right (left) profile does not interfere the left (right) profile.

One or more embodiments of the invention comprise a method for reformation of 2D portrait into the multi-layers image, consisting of several parallel planes covering such arrangement of pixels that the said multi-layers image has the same number of pixels as the corresponding 2D portrait and the said multi-layers image can be produced inside the transparent material without internal split.

One or more embodiments of the invention comprise a method for reformation of the 3D computer portrait into several 3D computer models having the same orientation and covered by pixels so that total number of their pixels is equal to the total number of unmodified 3D portrait pixels and all damages corresponding to the pixels can be produced inside the transparent material without internal split.

One or more embodiments of the invention comprise a method arranging the pixels so that the time production of the damages corresponding the pixels is minimal and for using focusing optical system any damage, which has been produced is not the barrier for production of following damages.

Figure 7:

1 is the damage, which has the same coordinates for the face and for the profile but its brightness for the face is smaller than for the profile;

2 is the damage creating the additional brightness for the material point under reviewing from the side;

3 is the damage, which has the same coordinates for the face and for the profile but its brightness for the face is smaller than for the profile;

5 is the damage, which together with the damages 3 and 4 creates the right gray shade for material point under reviewing from the front and the side;

6 is the damage, which has the same coordinates for the face and for the profile but its brightness for the profile is smaller than for the face;

7 is the damage creating the additional brightness for the material point under reviewing from the front;

FIG. 7. The front face photo of 3D portrait, produced inside an optically polished cube of high-index lead oxide glass.

Figure 8:

FIG. 8. The profile photo of 3D portrait, produced inside an optically polished cube of high-index lead oxide glass.

DETAILED DESCRIPTION OF THE INVENTION

The invention comprises method for creation of laser-induced damage 3D portraits inside optically transparent materials by special arrangement of the damages inside the 3D portrait area. In general, the invention relates to methods, in which laser energy is utilized to generate laser-induced damages based on the breakdown phenomenon.

The first step of 3D portrait production is creation of the applicable 3D computer model. The model can be created in a computer by using 3D scanner or by synthesizing from several 2D portraits by using commercial program as Poser and 3D Max 4. The creation of the model is not subject of the invention and we suppose that the 3D computer model has been created.

The second step of 3D portrait production is creation of damage arrangement or in other words it is necessary to find how laser-induced damages should be replaced in the space of a material to produce high quality 3D portrait. If we will produce the laser-induced damages in the material points corresponding to all pixels describing the 3D computer model then internal split will occur. It arises from the fact that the said pixels locate compactly without any distance between them.

The simplest reproduction method of the 3D model inside transparent material is the selection of the part of the pixels described the 3D model. Selected pixels correspond to the damages, between which distances are larger than $d_0$ (if the distance between adjacent damages is smaller than $d_0$, the internal split can occur). Creating breakdowns inside the transparent materials in points corresponding to the selected pixels, we can reproduce the model in the materials.

However, the 3D portrait produced by the method consists of damages which are distanced one from another and therefore, as stated above, it has two general defects:

1. Since the minimal distance between adjacent damages is not equal to zero, total number of damages in an image is smaller than total number of pixels in the computer image and therefore the spatial resolution of the image produced inside transparent material is smaller than the applicable computer image.

2. Since the distance between adjacent damages is not equal to zero (usually it is about the damage size), everybody sees the clearance surface of such 3D image although he looks at its face. The last factor decreases portrait contrast, creates noise background, match front and back images, match right and left profiles. All this decreases 3D portrait quality essentially. Consequently, such 3D portraits have bad quality and, for practical purposes, only half—3D portraits (without their back sections) are produced.

The present invention discloses a method creating such damage arrangement that 3D laser-induced damage portrait, produced by using this damage arrangement, has not disadvantages, stated above.

The method creating damage arrangement for production of 3D laser-induced damage portraits inside transparent materials comprises 9 steps.

Step 1. Three 2D pictures of the front face, right and left profiles of 3D portrait are produced by projection of the appropriate 3D computer model onto corresponding planes.

Step 2. These pictures are converted to 8-bit gray-scale and the number of the shades of gray in the images is reduced as much as possible without reducing substantially the high quality of these images.

The remarks: Step 1 and step 2 give information about number of pixels (the right space resolution) and the right number of the gray shades of each pictures. This information is necessary to arrange the pixels so that, producing all laser-induced damages, corresponding to all pixels of the images, the internal split could not occur.

Step 3. All pixels belonging to each image are divided on several (n) groups so that each group of the image contains maximum number of pixels and production of damages corresponding to the pixels does not create the internal split.

Step 4. All pixels forming each group are located on separate plane so that each picture (front face, right and left profiles of said 3D portrait) corresponds several planes (layers).

The remarks: Creation of groups (step 3) is obtained by rejection of the part of pixels contained in unmodified picture. Step 3 and step 4 convert 2D picture, corresponding one plane, into 3D picture, consisting of several planes, the number of which is equal to the number of pixel group, determined above. Though each group of pixels has smaller pixels than the unmodified picture and therefore the space resolution of each group is less than space resolution of the unmodified picture, together all groups guarantee the same resolution as resolution of the said picture. The reformation of one plane picture into 3D multi-layers image gives a chance to reproduce laser-induced damages corresponding to all pixels of the computer image and consequently, to produce picture with the same resolution as the computer image. For this only one condition should be fulfilled: the distance between layers should have the right value.

Step 5. Several 3D models are generated. The number (n) of the models is equal to the number of layers, which was defined in step 3. Each 3D model has the same center and the same orientation as the unmodified 3D model, but the surface of every following 3D model is apart from previous one on distance $L_0/n$ ($L_0$ is the minimal distance between the laser-induced damages replaced one after the other, when the internal crash is not happened, $L_0$ is not equal to $d_0$ and usually $L_0/n > d_0$).

Step 6. All first layer pixels of the front face picture are projected on the front face of the unmodified 3D model; all second layer pixels of the front face picture are projected on the front face of following (second) 3D model, the surface of which is distant from the surface of unmodified 3D model on distance $L_0/n$; all third layer pixels of the front face picture are projected on the front face of following (third) 3D model, the surface of which is distant from the surface of previous (second) 3D model on the said distance $L_0/n$; and so on . . . all last (n) layer pixels of the front face picture are projected on the front face of the last 3D model, the surface of which is distant from the surface of previous (n−1) 3D model on distance $L_0/n$.

Step 7. All first layer pixels of the right (left) profile picture are projected on the right (thereafter, left) side of the unmodified 3D model; all second layer pixels of the right (left) profile picture are projected on the right (thereafter, left) side of following (second) 3D model, the surface of which is distant from the surface of unmodified 3D model on the distance $L_0/n$; and so on . . . all last (n) layer pixels of the right (left) profile picture are projected on the right (thereafter, left) side of the last 3D model, the surface of which is distant from the surface of the previous (n−1) 3D model on the distance $L_0/n$.

The remarks: Steps 5, 6, 7 guarantee the representation of any 3D portrait by block of pixels, which are replaced both on the surface of the unmodified 3D model and inside the 3D portrait. Since the damages, corresponding the pixels, are replaced not directly one after the other the distance between adjacent models can be equal to maximum value $d_0$ or $L_0/n$, where n is total number of all embedded models. Such arrangement of the pixels permits to produce the laser-induced damages corresponding to all these pixels without a crash inside a transparent material. In addition, space resolution of the face, right and left profiles of the 3D portrait is the same as the computer model. Further, the damages produced inside a transparent material render all pixels of 3D computer model, therefore their projections on the front plane and side planes cover the planes compactly. Consequently, the 3D portrait has the high contrast and looking at the face you do not see back images (hair, hat and all that). Similarly, looking at the right profile you do not see the left profile and on the contrary.

However, making steps 6 and 7 it is possible that several pixels of the front face and several pixels of the right or the left profiles have the same coordinates inside the 3D portraits. Each pixel contains information about coordinates of that material point where the damage should be produced and about how the damage should be created to reproduce the right shade of gray. For example, the last information can concern to the pulse energy, which should be used to produce a laser-induced damage in the material point. If pixels, having the same coordinates, have the same gray shade then not two but only one damage with the right energy should be produced. If the said pixels have different shades of gray then it is necessary to perform a correction of the damage arrangement.

The correction is based on following physical phenomenon: a gray shade of the damage is the relative intensity of the scattered exterior light and therefore the right gray shade of the material point, which is reviewed at this direction, can be created by production of the laser-induced damage of the appropriated sizes or by production of couple (or more) damages, following one after the other and having the right sizes. In other words, the same gray shade of the material point can be created by producing single damage or by several damages with appropriated sizes.

Consequently, if the pixel of the face has the same coordinates as the pixel of the right or left profile, but the right gray shade of the face damage does not consist with the right gray shade of the profile damage, then it is necessary to make following: 1) the single damage should be produced in the material point, having the said coordinates; the sizes of the damage should have the value corresponding creation of the gray shade, which is equal to minimum value of the face and profile damages; 2) if the minimum gray shade value is the value of the face damage then the next laser-induced damage is produced in the point displaced from the previous damage perpendicularly to the profile plane (in general case, it is possible the small deflection from the direction); the said second damage should have the sizes corresponding to the intensity of the scattered exterior light creating the right gray shade together with the previous damage; if the minimum gray shade value is the value of the profile damage then the next laser-induced damage is produced in the point displaced from the previous damage perpendicularly to the face plane and the exterior light scattered by the damage creates the right gray shade.

Step 8. All pixels corresponding to the face and the profiles, having the same coordinates and different gray shades are selected. The special groups of the laser-induced damages are created for reproduction of the selected pixels. Each group consists the damage, which is produced in the point with the said coordinates. The sizes of the damage correspond to creation of the minimal value of the face and the profiles gray shades. The next damage of the each group has the sizes so that exterior light scattering by the damage and the previous damage creates right value of gray shade. The distance between these damages is not smaller than $L_0$. The second damage is replaced perpendicularly to the front face plane if the face gray shade is larger than profile gray shade and the second damage is replaced perpendicularly to the side profile plane if the face gray shade is smaller than the profile gray shade.

The remarks:

1. The 3D portrait, creating by the steps 1–8 has the same space resolution and the tight cover without distances between adjacent damages, from front face, left and right profile sides. Usually it is enough for practical purposes. However, if it is necessary to have the same character from the top and back directions, we should produce 2D projections of unmodified 3D computer model onto corresponding planes and made all 2–8 steps for these projections.

2. Desiring to produce all damages corresponding to all pixels of 3D computer model and using the production method disclosed in U.S. Pat. No. 5,637,244 to Erokhin, we should spend much time for the production. Indeed, the Patent discloses a method "wherein the focusing step comprises moving the transparent material relative to the laser beam perpendicularly to the laser beam to create microdestructions that form a first two-dimensional plane section of the decorative image, said first plane section appearing as a first array of image elements of the decorative image". For our case the said plane sections are parallel cut sets of 3D portrait and distances between adjacent damages of each section can be large. Therefore, it is reasonable to produce the damage arrangement in accordance with the rule: the next damage is the nearest neighbor to the following damage. In this connection, the previous damage does not hinder the next damage. This condition is very important and for Erokhin's method, it is performed automatically. For the said rule it is necessary to take into account that damage is produced by focused beam and therefore the next damage can be created only if no damage is inside the angle formed by the said focused laser beam.

Step 9. The array of damages, which should be made, is created so that the next produced damage is the nearest neighbor to the previous damage and that no damage is inside the angle made by the focused laser beam, creating breakdown.

The example mentioned below illustrates steps described above.

Figure 1:
FIG. 1. 2D picture of the front face of 3D computer portrait after diminution of the gray shades (after steps 1,2).

FIG. 1 shows the 2D picture made by projection of the appropriate 3D computer model onto front plane after diminution of its gray shades. Thereby it is an effect of steps 1 and 2. We see that in the case five shades of gray is sufficient for good quality of the portrait.

Figure 2:
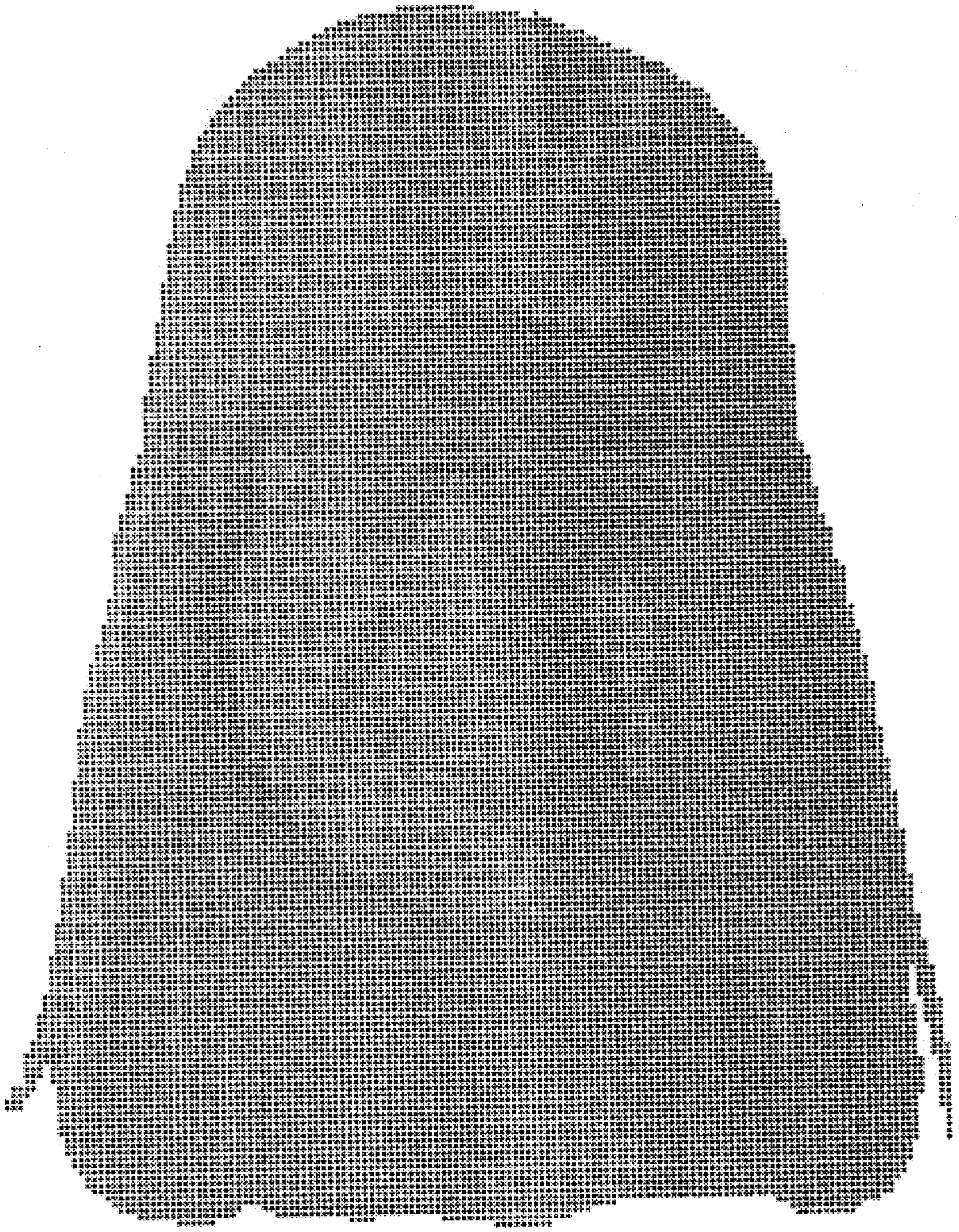
FIG. 2. The $1^{st}$ pixel group of the 2D picture, containing maximum number of pixels so that production of damages corresponding to the pixels does not create the internal split (after step 3).
Figure 3:
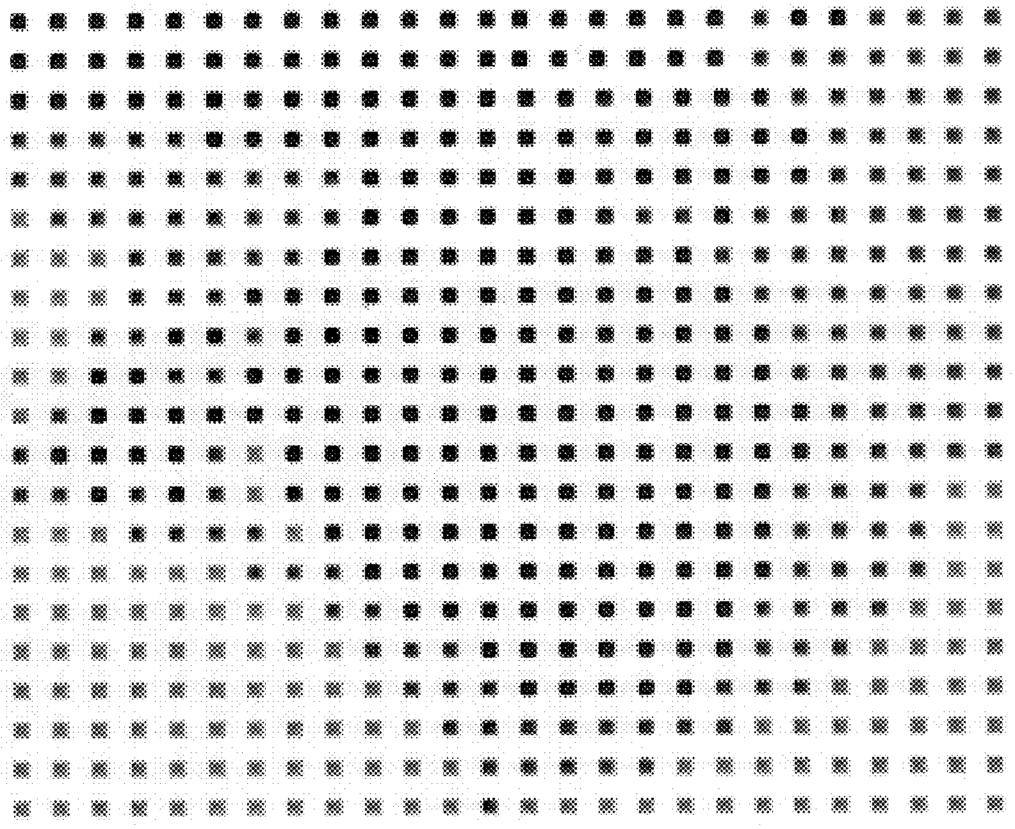
FIG. 3. The part of the first group of pixels belonging to the right eye aria.

In accordance with following step, all pixels of the image are divided on several (n) groups so that each group of the image contains maximum number of pixels and production of damages corresponding to the pixels does not create the internal split. We will produce the 3D portrait inside an optically polished cube of high-index lead oxide glass. In this case, distance between adjacent damages, when the internal split does not occur, equal to the damage size. Under this stipulation, it is enough to create four (n=4) groups pixels: the pixels of the first plurality have even coordinates X, Y; the pixels of the second group have odd coordinates X, Y; the third plurality consists of pixels with even X and odd Y coordinates; and the forth plurality consists of points with odd X and even Y coordinates. FIG. 2 illustrates the pixels of $1^{st}$ group and FIG. 3 shows the part of the pixels belonging to the right eye aria.

Figure 4:
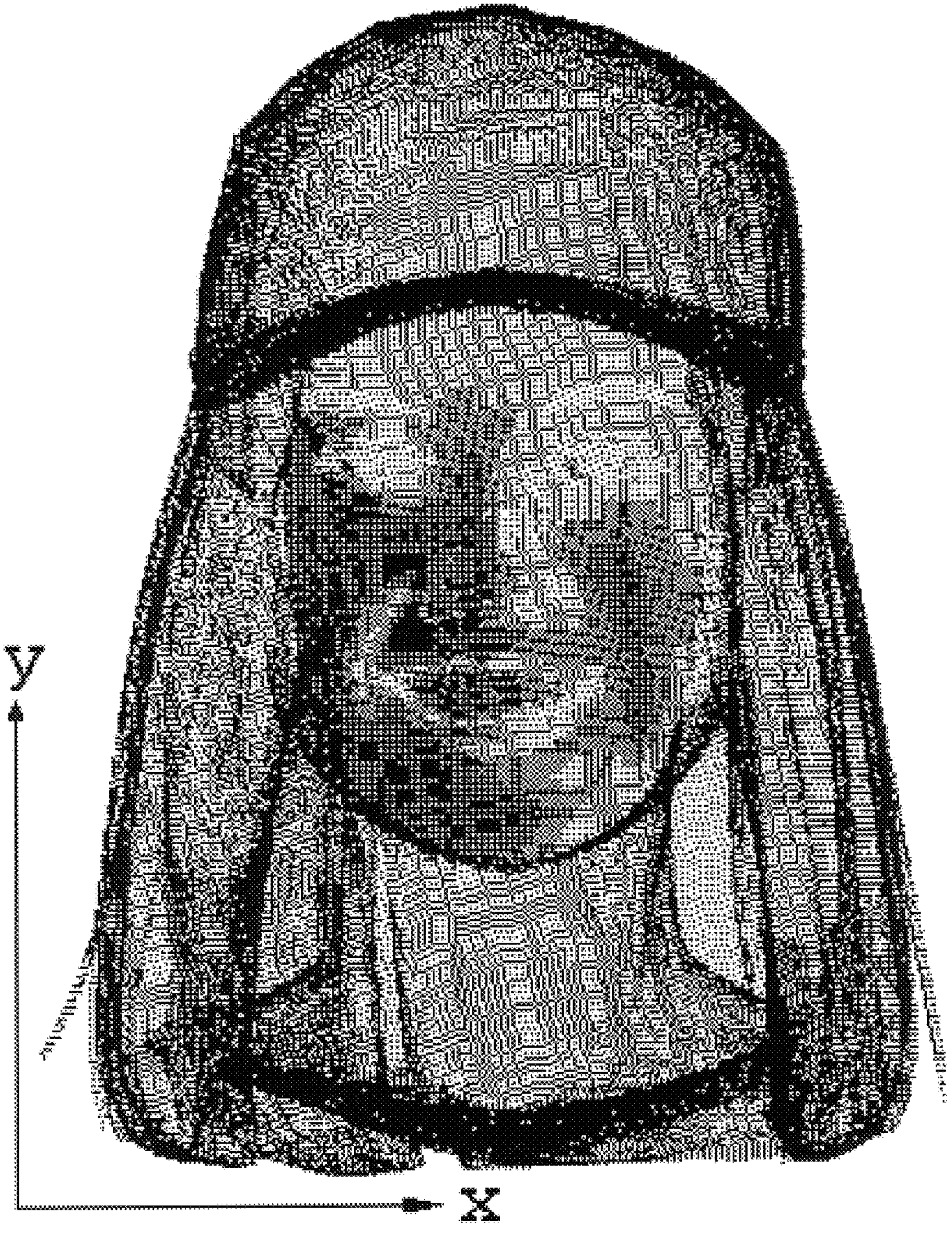
FIG. 4. The arrangement of pixels, corresponding to the front face of the 3D models nested one into the other (after steps 4,5,6).
Figure 5:
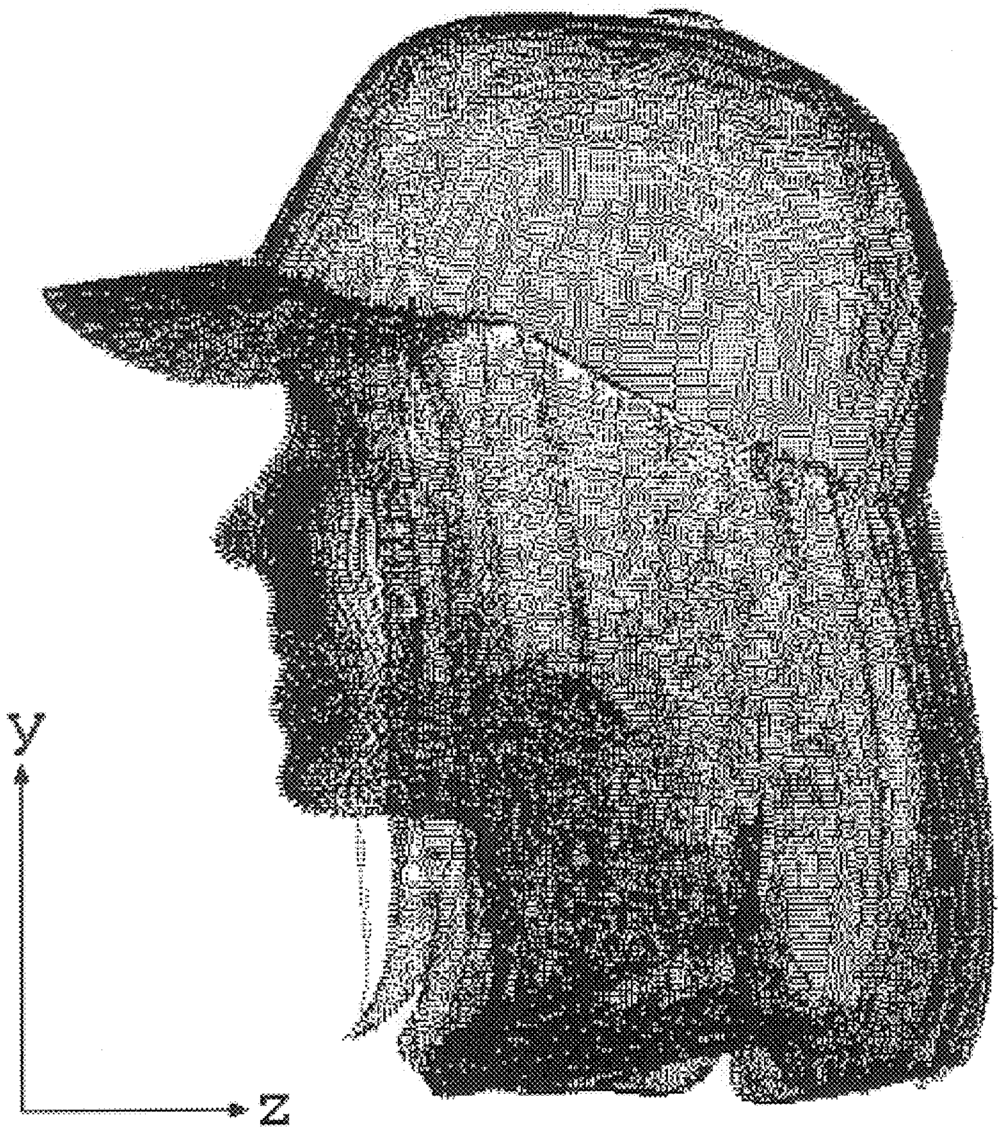
FIG. 5. The arrangement of pixels, corresponding to the profile of the 3D models nested one into the other (after steps 4,5,7).

These four groups of pixels are located on separate planes so that the said 2D picture becomes multi-layers 3D image. It is the result of the step 4. In accordance with step 5 four 3D models are generated. For used focusing optics and for the high-index lead oxide glass the minimal distance between the laser-induced damages replaced one after the other, when the internal crash is not happened, $L_0$=0.16 mm, therefore the distance between the adjacent 3D models is equal to $L_0$/n=0.04 mm. All pixels of the each group are projected on the models (step 6). The result of the operation is shown on the FIG. 4. FIG. 5 illustrates the pixel arrangement for the profile of the said 3D models made as the pixel plurality of FIG. 4.

Figure 6:
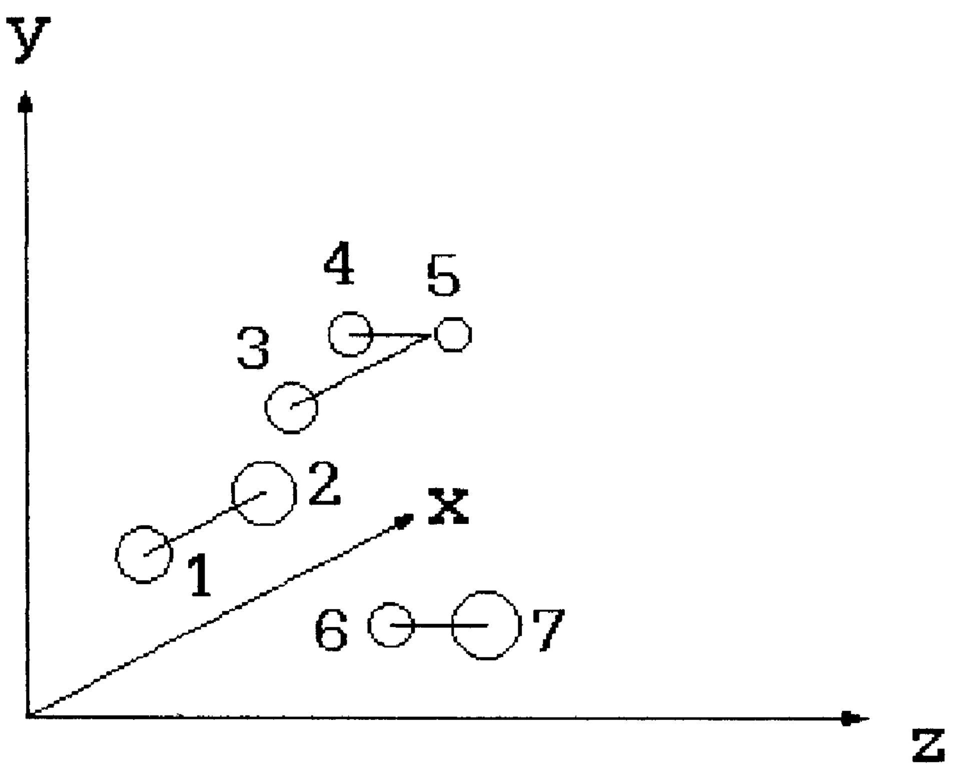
FIG. 6. The examples of the laser-induced damages, corresponding the pixels, which have the same coordinates for the face and the profiles, and creating the right gray shades of the material points.

FIG. 6 illustrates the creation of the right gray shades for the material points, when the pixels of face and profiles have the same coordinates but the material points have different gray shades for face and for profile (step 8). Damages 1 and 2 create the right gray shades for the material point 1. In this case, the damage brightness for the face should be smaller than for the profile and therefore two damages are produced: the first has the brightness, corresponding to the gray shade of the face and the second, displaced from the previous damage perpendicularly to the profile plane, creates the right brightness for the point of the profile. Damage 5 is additional for creating the right brightness for the face (together with damage 4) and for the profile (together with damage 3). So damage 5 has smaller sizes, it has a short displacement from damages 3 and 4. The point, corresponding to damage 6 should have the smaller brightness for the profile than for the face, therefore damage 6 has the profile brightness and damage 7 creates the additional brightness under reviewing from the front.

After creation of the right gray shades of all material points where coordinates of the face pixels consists with coordinates of the profile pixels, the array of damages is created so that the next produced damage is the nearest neighbor to the previous damage and so that no damage is inside the angle made by the focused laser beam creating breakdown (step 9). The arrangement of the laser-induced damages produced in an optically polished cube of high-index lead oxide glass is shown on FIGS. 7 and 8. FIG. 7 illustrates the front face photo and FIG. 8 shows the profile of the 3D portrait.

We claim:

1. A method for creating arrangement of damages for production of 3D laser-induced damage portraits with the space resolution, which is equal to the appropriate computer 3D model and with sufficiently tight face and profiles so that the clearance surface dose not interfere the face surface, and the right (left) profile does not interfere with the left (right) profile, comprising creating the block of embedded 3D computer models and covering the said models by the arrangements of pixels so that:

a) The total number of pixels contained in the all said models is equal to the number of pixels contained in the unmodified 3D computer model;

b) The production of the laser-induced damages inside the transparent material corresponding the said pixels does not make the internal split.

2. A method in accordance with claim 1 wherein 2D face portrait, 2D right profile portrait, 2D left profile portrait, made as the projections of unmodified 3D computer model, are reformed into 3D pictures, consisting of several planes (several parallel layers) and each said plane is covered by such arrangement of pixels that the laser-induced damages produced inside the transparent material do not make internal split and each 3D multi-layer image has the same number of pixels as the appropriate 2D image.

3. A method in accordance with claim 1 wherein several 3D models are created so that each of them has the same orientation; the distance between adjacent models is equal to the right value; the number of said 3D models is equal to number of layers of the face and the profiles multi-layers pictures; each 3D model is covered by pixels which are the projections of the appropriate layer of the modified face and profile images.

4. A method in accordance with claim 1 wherein creation of the right gray shade of the point of the transparent material in case when coordinates of the face pixel consist with coordinates of the profile pixel, is made by production of several (more than one) damages following one after the other at the direction of observation.

5. A method in accordance with claim 1 wherein the array of damages, which should be made, is created so that the next produced damage is the nearest neighbor to the previous damage and that no damage is inside the angle made by the focused laser beam creating breakdown.

* * * * *